US010669768B2

(12) United States Patent
Amacker et al.

(10) Patent No.: US 10,669,768 B2
(45) Date of Patent: Jun. 2, 2020

(54) ROBOTIC POWER DELIVERY

(71) Applicant: Toyota Research Institute, Inc., Los Altos, CA (US)

(72) Inventors: Matthew Amacker, Santa Clara, CA (US); Jonathan Yao, San Jose, CA (US); Andrew Custer, Oakland, CA (US); Joe Taylor, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 16/146,482

(22) Filed: Sep. 28, 2018

(65) Prior Publication Data

US 2020/0102781 A1     Apr. 2, 2020

(51) Int. Cl.
| | | |
|---|---|---|
| *H02J 50/90* | (2016.01) | |
| *H02J 50/10* | (2016.01) | |
| *E05F 15/77* | (2015.01) | |
| *A47B 88/457* | (2017.01) | |
| *A47B 77/08* | (2006.01) | |
| *H04B 5/00* | (2006.01) | |
| *B25J 5/00* | (2006.01) | |
| *H02J 7/00* | (2006.01) | |

(52) U.S. Cl.
CPC .............. *E05F 15/77* (2015.01); *A47B 77/08* (2013.01); *A47B 88/457* (2017.01); *B25J 5/007* (2013.01); *H02J 50/10* (2016.02); *H02J 50/90* (2016.02); *H04B 5/0037* (2013.01); *E05Y 2201/232* (2013.01); *E05Y 2900/20* (2013.01); *H02J 7/00* (2013.01)

(58) Field of Classification Search
CPC ................... H02J 50/90; H02J 50/10

USPC ........................................................ 320/114
See application file for complete search history.

(56) References Cited

U.S. PATENT DOCUMENTS

| | | | |
|---|---|---|---|
| 3,028,209 A | | 4/1962 | Hinkel et al. |
| 5,284,366 A | * | 2/1994 | Herberman et al. ..... F16L 37/00 285/148.27 |
| 5,697,285 A | * | 12/1997 | Nappi et al. ............... B25J 3/04 91/519 |
| 6,011,372 A | * | 1/2000 | Popovich, Jr. et al. ..................... G05B 19/042 318/560 |
| 6,150,738 A | * | 11/2000 | Yim ....................... B25J 9/1617 307/125 |

(Continued)

FOREIGN PATENT DOCUMENTS

| | | |
|---|---|---|
| CA | 2797191 A1 | 5/2014 |
| CN | 201700725 U | 1/2011 |
| CN | 202386203 U | 8/2012 |

OTHER PUBLICATIONS

Ishii et al., Delivering electricity to home appliances by mobile robots, IEEE, published Sep. 29, 2014, 1 page.

*Primary Examiner* — Sun J Lin
(74) *Attorney, Agent, or Firm* — Dinsmore & Shohl LLP

(57) ABSTRACT

A system includes a door, an external electrical connection electrically coupled to a charge store, an opening assembly including a controller, an actuator, a gear, and an actuator arm. The actuator arm is mechanically coupled to the actuator and removably coupled to the door such that the actuator arm opens or closes the door upon actuation of the actuator and the external electrical connection electrically couples to a mobile robotic power delivery device that includes a battery to provide electrical power to the actuator and the controller.

20 Claims, 7 Drawing Sheets

(56) References Cited

U.S. PATENT DOCUMENTS

| | | |
|---|---|---|
| 8,066,341 B2 | 11/2011 | Brustle |
| 9,711,997 B2 | 7/2017 | Raghavan et al. |
| 2002/0171335 A1 | 11/2002 | Held |
| 2010/0178135 A1* | 7/2010 | Laceky et al. ....... B25J 19/0029 <br> 414/217 |
| 2012/0045303 A1* | 2/2012 | Macdonald ............. A47F 10/00 <br> 414/373 |

* cited by examiner

ROBOTIC POWER DELIVERY

TECHNICAL FIELD

The present specification generally relates to robot systems and methods and, more specifically, to robot systems and methods that provide on-demand robotic power delivery to various electronic devices.

BACKGROUND

Certain conventional household items, including storage compartments, furniture, fixtures, electronic devices, latching/locking mechanisms, and/or the like may be embedded with electro-mechanical components that make the household items easier to use, provide additional functionality, and/or the like. In addition, certain household items may be coupled with electronic components that allow the items to be communicatively coupled to other devices (e.g., Internet of Things (IoT) devices). While such electro-mechanical and electronic components may increase the functionality of the household items, the electrical power requirement of the household items is also increased. Certain household items may not conveniently or feasibly be located near a constant power source, and thus may need to rely on batteries or other local power storage in order to receive on-demand power when needed. As such, the batteries or other local power storage may be difficult and/or inconvenient for users to replace or recharge.

SUMMARY

In one embodiment, a system includes a door, an external electrical connection electrically coupled to a charge store, an opening assembly including a controller, an actuator, a gear, and an actuator arm. The actuator arm is mechanically coupled to the actuator and removably coupled to the door such that the actuator arm opens or closes the door upon actuation of the actuator and the external electrical connection electrically couples to a mobile robotic power delivery device that includes a battery to provide electrical power to the actuator and the controller.

In another embodiment, a robotic power delivery system includes a robot including a battery electrically coupled to an end effector that is configured to contact a receiver of an external electrical circuit, a mobile base, and an electronic control unit comprising a processor and a non-transitory computer readable memory storing one or more instructions. The robot applies a charge to the receiver based on the one or more instructions stored in the non-transitory computer readable memory.

In yet another embodiment, a system for applying an electrical charge includes a mobile robotic power delivery device comprising a battery, a charging station for charging the battery of the mobile robotic power delivery device, and an external device including a charge store and one or more of an electrical component and an electromechanical component. The mobile robotic power delivery device receives an electrical charge from the charging station, determines a location of the external device, moves to the external device, and supplies a second electrical charge to the charge store of the external device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
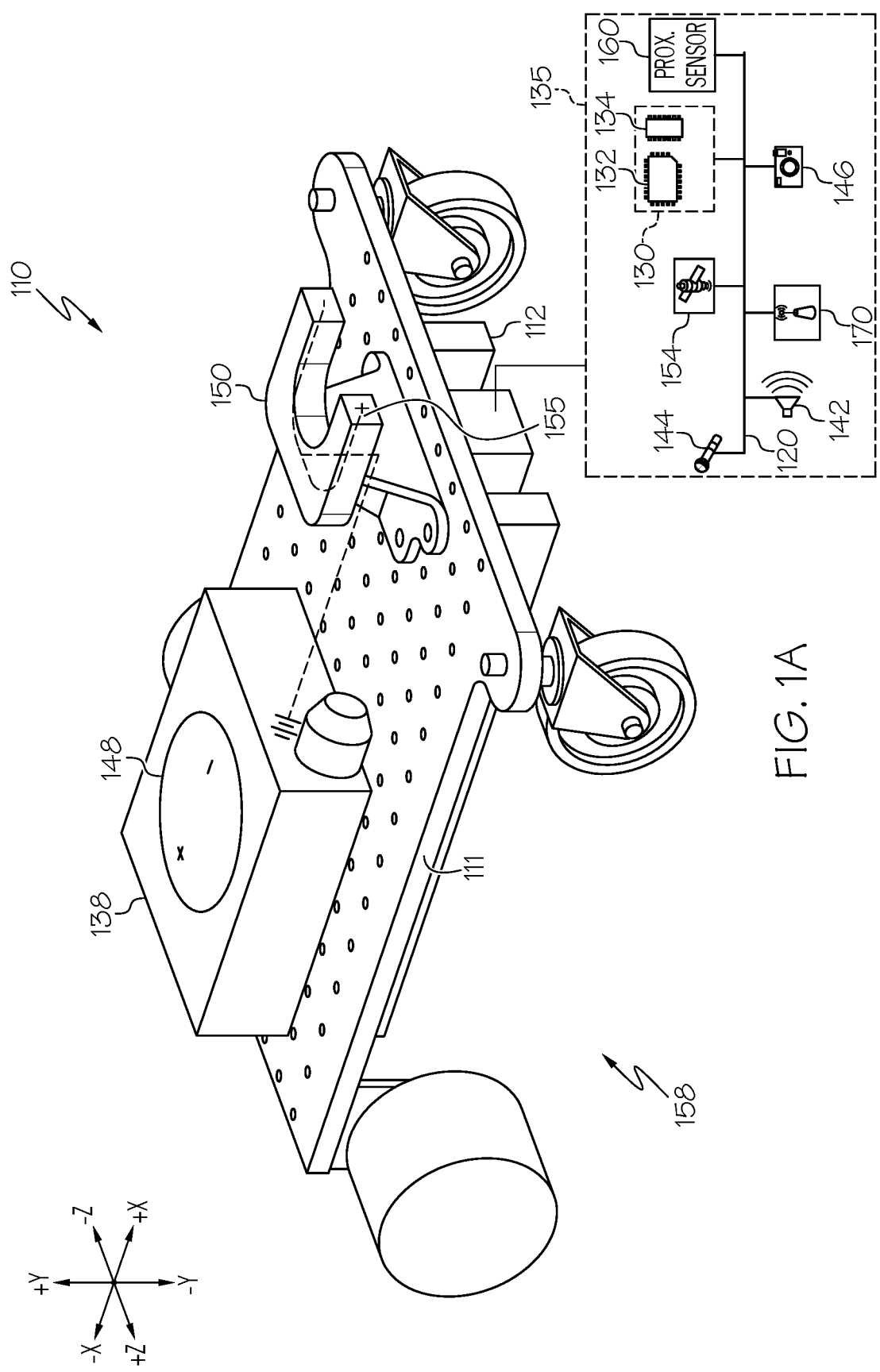
FIG. 1A depicts an illustrative robot for delivering electrical power to one or more external electrical circuits, according to one or more embodiments shown and described herein.
Figure 1B:
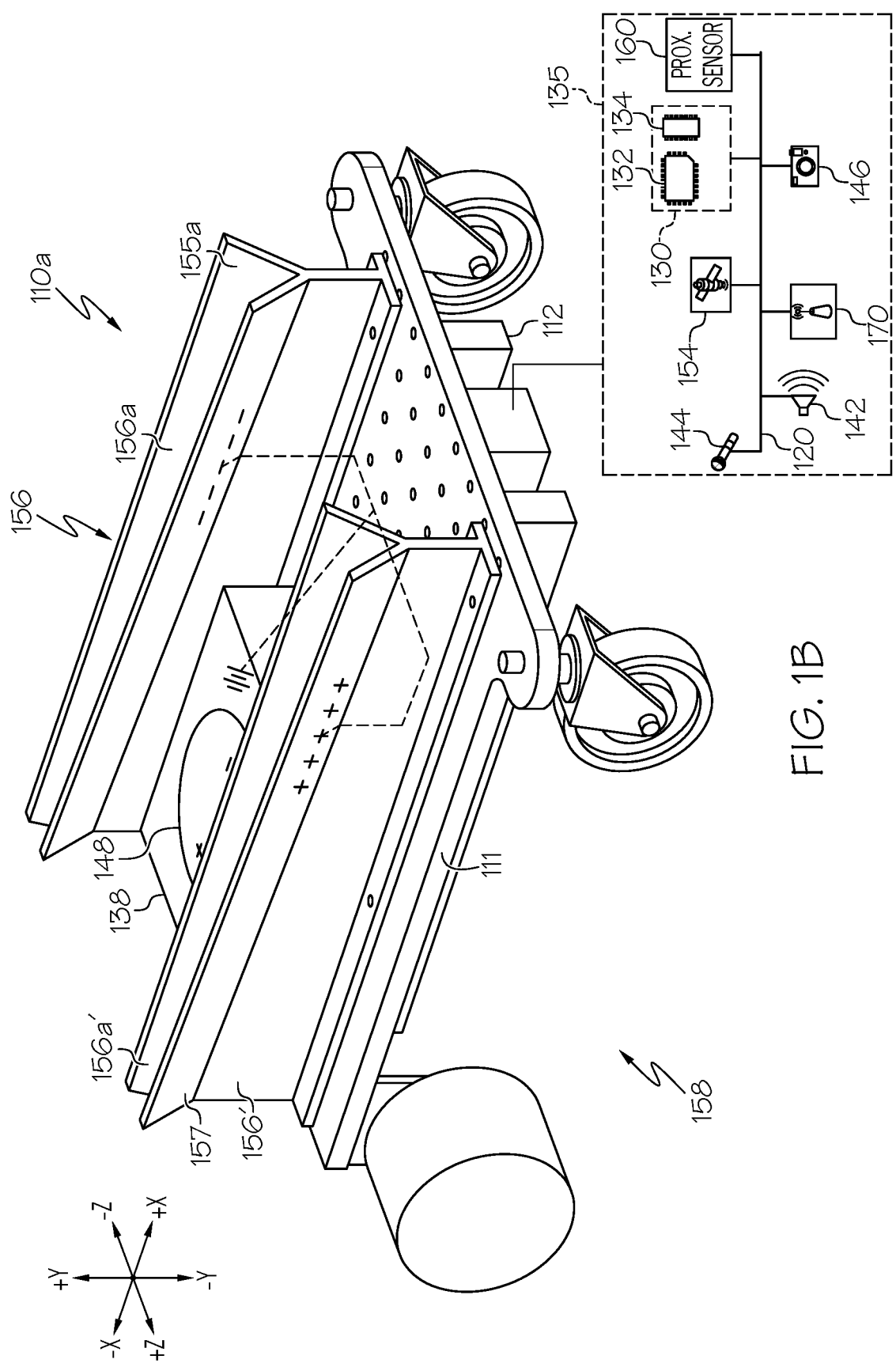
FIG. 1B depicts another illustrative robot for delivering electrical power to one or more external electrical circuits, according to one or more embodiments shown and described herein.

The embodiments disclosed herein include robot systems and methods for supplying electrical power to external electrical circuits, such as electrical circuits contained within one or more household items. Examples of household items include, but are not limited to, storage compartments, furniture, fixtures, electronic devices, IoT devices, and the like. While household items, particularly cabinets, are described herein, it should be understood that other items, devices, components, or the like requiring electrical power that are not accessible to a constant power supply (e.g., AC power) and have a local battery or other energy storage component are included within the scope of the present disclosure. Referring generally to FIGS. 1A and 1B, a mobile robotic power delivery device, or robot, may include a battery and electrical contacts for contacting a receiver of an external electrical circuit. Machine-readable instructions read by a processor cause the robot to deliver power to the external electrical circuit, which is stored in a local battery or other energy storage device for future access.

Turning now to the drawings wherein like numbers refer to like structures, and particularly to FIG. 1A, an embodiment of an illustrative robot 110 is shown. The robot 110 includes a base 111 supporting a lower housing 112, a battery 138, a robot arm 150, robot arm electrical contacts 155, and a motorized wheel assembly 158. Additionally, the robot 110 may include a sensor array 135 that may include sensors for sensing and navigating the environment. The sensor array 135 may include a speaker 142, a microphone 144, a camera 146, a location sensor 154, a proximity sensor 160, and/or network interface hardware 170. The sensors may be communicatively coupled to an electronic control unit 130 through a communication path 120. The functionality and interconnection of the sensors and other devices will be described in greater detail below with respect to FIG. 2. The sensors and other devices included on the robot 110 may enable the robot to move autonomously within an environment.

The lower housing 112, the battery 138, the robot arm 150, and the motorized wheel assembly 158 may be physically coupled to the base 111, and the base 111 may support each of the components coupled to it as the robot 110 moves from place to place. The battery 138 may electrically power the motorized wheel assembly 158 and/or the robot arm 150. The robot arm electrical contacts 155 may also be electrically coupled to the battery 138 such that the robot arm electrical contacts 155 can supply electrical power to external systems as will be described in greater detail herein.

Still referring to FIG. 1A, the robot 110 may be powered by the battery 138, which is electrically coupled to the various electrical components of the robot 110. The battery 138 may be any device capable of storing electric energy for later use by the robot 110. In some embodiments, the battery 138 is a rechargeable battery, such as a lithium-ion battery or a nickel-cadmium battery. As used herein, the term "battery" may refer to the energy store used to power the robot 110, as well as the various external devices, as explained in greater detail herein. The term "battery" refers to the collective energy store on the robot 110 and includes, without limitation, batteries, capacitors, and other sources of electrical energy that may be used to power the robot 110 and/or supply power to external circuits. In embodiments in which the battery 138 is a rechargeable battery, the robot 110 may include a charging port, which may be used to charge the battery 138. Some embodiments may not include a charging port, such as embodiments in which the robot 110 utilizes disposable batteries for power or charges the battery 138 using a wireless charging module. Additional details regarding charging of the battery 138 will be described herein.

The battery 138 may store electrical energy for use by an external device or system, such as the storage compartments to open and shut the storage compartments, as described in greater detail herein. Accordingly, the battery 138 may be electrically coupled to the wireless charger module 148 and/or the robot arm electrical contacts 155 that may be disposed in or on the robot arm 150 such that electrical energy may pass through the robot arm electrical contacts 155 on the robot arm 150 to one or more electrical connections on an external device as will be described in greater detail herein. Additionally, the robot arm 150 may be configured to wirelessly charge components of an external electrical circuit, for example, an electro-mechanical or an IoT device, using a wireless electrical connection as described herein.

In some embodiments, the battery 138, or portions thereof, may include one or more supercapacitors. Supercapacitors have high specific powers and low resistance, enabling high current loads and may charge quickly, reducing the amount of time that the robot 110 requires at the base station. Supercapacitors may be useful for energy storage undergoing frequent charge and discharge cycles at high current and short duration.

The robot arm 150 may be coupled to the communication path 120. The communication path 120 may communicatively couple the robot arm 150 to the electronic control unit 130. The robot arm 150 may include multiple mechanical segments linked together by servos, actuators or other types of joint forming a kinematic chain. One end of the robot arm 150 may include an end effector for contacting or otherwise manipulating items. An opposing end of the robot arm 150 may be mounted to the robot 110. The electronic control unit 130 which is communicatively coupled to the robot arm 150 provides commands in the form of signals to the robot arm 150 to manipulate its movement. For example, the electronic control unit 130 using image data from the one or more cameras 146 may provide signals to the robot arm 150 to navigate the end effector proximate an electrical contact, to contact the electrical contact, and to apply electrical power to the electrical contact.

The robot arm 150 may include the robot arm electrical contacts 155 or the wireless charger module 148 for electrically coupling the battery 138 with components for applying an electric charge to the external components as described herein. Additionally, it is to be understood that the robot arm 150 is not limited to any type of configuration or arrangement. The robot arm 150 is only one of many possible types of end effectors. While the end effector is described herein as an arm, it is to be understood that the principals of operation of the robot arm 150 could be applied to other types of end effectors. For example, the robot 110 may include a cup, a hand, or a scoop that includes one or more electrical connections or wireless charging apparatuses for applying electrical energy to the external components.

Still referring to FIG. 1A, the robot arm electrical contacts 155 may extend from the robot 110. The robot arm electrical contacts 155 may extend forward of the robot 110 (e.g., in the +x direction as shown in FIG. 1A) such that the robot arm electrical contacts 155 contact a receiver for receiving an electrical charge. In some embodiments, the robot arm 150 may include a fixed orientation with respect to the robot 110, but in other embodiments, the orientation of the robot arm 150 may move. For example, the robot arm 150 may pivot, swivel, extend, rotate, or fold from its position shown in FIG. 1A. In some embodiments, the robot arm 150 may extend upward (e.g., in the +Y direction as shown in FIG. 1A). Accordingly, the robot arm 150 may include a physical structure to support such movement. For example, the robot arm 150 may include one or more pivots, swivels, telescoping arms, or the like.

The robot arm 150 is electrically coupled to the battery 138 such that the battery 138 can supply a charge to an external component via the robot arm 150 and the robot arm electrical contacts 155, as described herein.

In some embodiments, the robot arm 150 or another portion of the robot 110 includes a wireless charger, such as a wireless charger module 148. The wireless charger module 148 may be communicatively coupled to the communication path 120 in some embodiments. The wireless charger module 148 is electrically coupled to the battery 138. In some embodiments, the wireless charger module 148 is an inductive wireless charger module operable to charge by inductive wireless charging. In embodiments in which the wireless charger module 148 is an inductive wireless charger module, the inductive wireless charger module 148 includes at least one primary coil that is electrically coupled to a source of electrical energy, such as the battery 138. The primary coil may be energized such that electric current flows through the primary coil, creating an electromagnetic field that may induce current flow in a secondary coil of the device that is to be charged, for example, an actuator of an electro-mechanical device such as the storage compartment. When the secondary coil is inductively coupled to the primary coil (e.g., by placing the secondary coil in close proximity to the primary coil). The induced current flow of the secondary coil may be used to charge a battery or a capacitor or to otherwise power the electro-mechanical device. In some embodiments in which the wireless charger module 148 is an inductive wireless charger module, the wireless charger module 148 may be compliant with the Qi wireless charging protocol, the A4WP wireless charging protocol, or any other wireless charging protocol. In other embodiments, the wireless charger module 148 may be a conductive wireless charger module, a resonance wireless charger module, or a radio wireless charger module. In some embodiments, the wireless charger module 148 may include one or more components for wirelessly charging an external electrical circuit using a wireless electrical connection of the robot arm 150.

The robot 110 may also include the electronic control unit 130 within the lower housing. The electronic control unit 130 may include a processor 132 and a non-transitory computer readable memory 134. The non-transitory computer readable memory 134 may store machine-readable instructions that, when executed by the processor 132, cause the processor 132 to provide a drive signal to the motorized wheel assembly 158 such that the motorized wheel assembly 158 moves the robot 110 to a desired location within the environment. The motorized wheel assembly may include one or more wheels and/or other implementations for supporting the robot 110 as it moves. For example, it is contemplated that the robot 110 may be supported by one or more skis, rotors, wings or other devices for moving within the environment.

Still referring to FIG. 1A, the location sensor 154 may be any device capable of generating an output indicative of a location. In some embodiments, the location sensor 154 includes a global positioning system (GPS) sensor, though embodiments are not limited thereto. Some embodiments may not include the location sensor 154, such as embodiments in which the robot 110 does not determine a location of the robot 110 or embodiments in which the location is determined in other ways (e.g., based on information received from the camera 146, the microphone 144, the network interface hardware 170, or the like). The location sensor 154 may also be configured as a wireless signal sensor capable of triangulating a location of the robot 110 and the user by way of wireless signals received from one or more wireless signal antennas.

Still referring to FIG. 1A, the robot 110 may further include the proximity sensor 160. The proximity sensor 160 may be any device capable of outputting a proximity signal indicative of a proximity of the robot 110 or portions thereof (e.g., the robot arm 150) to another object. In some embodiments, the proximity sensor 160 may include a laser scanner, a capacitive displacement sensor, a Doppler effect sensor, an eddy-current sensor, an ultrasonic sensor, a magnetic sensor, an internal sensor, a radar sensor, a LIDAR sensor, a sonar sensor, or the like. Some embodiments may not include the proximity sensor 160, such as embodiments in which the proximity of the robot 110 to an object is determined from inputs provided by other sensors (e.g., the camera 146, the speaker 142, etc.) or embodiments that do not determine a proximity of the robot 110 to an object.

Referring now to FIG. 1B, another illustrative robot 110a is depicted. The robot 110a includes the battery 138 and the motorized wheel assembly 158. Robot arm electrical contacts 155a extend upward from the robot 110a. The robot arm electrical contacts 155a may take the form of troughs 156, 156' that can catch and contain wires hanging from an external electrical circuit, rather than contacting external electrical contacts by extending from the front portion of the robot 110 as with the robot arm electrical contacts 155 shown in FIG. 1A. At least a portion of the troughs 156, 156' may comprise electrical contacts. For example, an internal side 156a, 156a' of a wall 157 of the troughs 156, 156' may be electrically coupled to the battery 138 and the internal sides 156a, 156a' may form a circuit with external electrical contacts as will be described in greater detail herein, causing current to flow from the battery 138 to the external electrical circuit. The troughs 156, 156' may have a sloping profile in which a bottom edge of the troughs 156, 156' may increase in height along the robot longitudinal (+/−X direction). As shown in FIG. 1B, the height of the trough may increase along the −X direction. The gradual increase in height may increase the likelihood that hanging wires will contact the troughs 156, 156'. The walls 157 of the troughs 156, 156' inhibit wires that are in the troughs 156, 156' from leaving the troughs 156, 156' so that electrical contact can be maintained.

The robot 110a may include a sensor array 135a and other devices for sensing and navigating the environment similar to the array of sensors and other devices shown on the robot 110 in FIG. 1A. For example, the robot 110a may include the speaker 142, the microphone 144, the camera 146, the location sensor 154, and the proximity sensor 160. The sensors and other devices included on the robot 110a may enable the robot to move autonomously within the environment.

Figure 2:
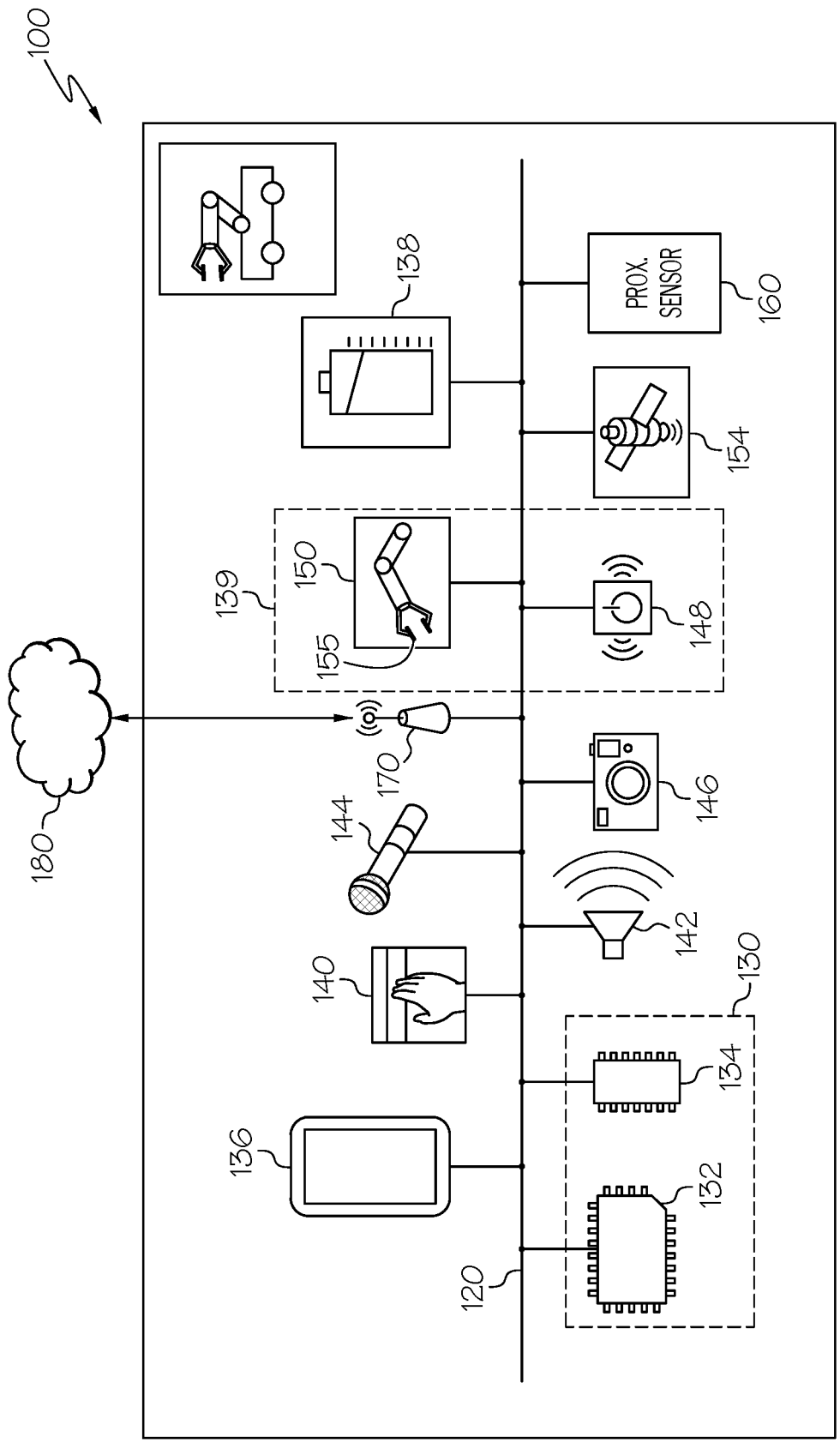
FIG. 2 schematically depicts an illustrative robot system for delivering electrical power, according to one or more embodiments shown and described herein.

FIG. 2 schematically depicts illustrative internal components (e.g., a robot control system 100) for controlling the robot 110 (FIG. 1A) or robot 110a (FIG. 1B). As shown in FIG. 2, the robot control system 100 includes the communication path 120, an electronic control unit 130 having a processor 132 and a non-transitory computer readable memory 134, a display 136, the battery 138, an input device 140, the speaker 142, the microphone 144, one or more cameras, such as the camera 146, a power delivery module 139 that may include the wireless charger module 148 and/or the robot arm electrical contacts 155 coupled to the robot arm 150, the location sensor 154, the proximity sensor 160, and the network interface hardware 170 for connecting to a network 180. The robot 110 is communicatively coupled to a network 180 by way of the network interface hardware 170. The components of robot 110 may be physically coupled together or may be communicatively and operably coupled through the communication path 120 and/or the network 180. The various components of the robot 110 and the interaction thereof will be described in detail below.

The communication path 120 may be formed from any medium that is capable of transmitting a signal such as, for example, conductive wires, conductive traces, optical waveguides, or the like. The communication path 120 may also refer to the expanse in which electromagnetic radiation and their corresponding electromagnetic waves traverses. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may be a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the robot 110. As used herein, the term "communicatively coupled" means that coupled components are capable of exchanging signals with one another such as, for example, electrical signals via conductive medium, electromagnetic signals via air, optical signals via optical waveguides, and the like.

Still referring to FIG. 2, the electronic control unit 130 may be any device or combination of components comprising a processor 132 and non-transitory computer readable memory 134. The processor 132 of the robot control system 100 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the robot control system 100 by the communication path 120. Accordingly, the communication path 120 may communicatively couple any number of processors 132 with one another, and allow the components coupled to the communication path 120 to operate in a distributed computing environment. Specifically, each of the components may operate as a node that may send and/or receive data. While the embodiment depicted in FIG. 2 includes a single processor 132, other embodiments may include more than one processor 132.

The non-transitory computer readable memory 134 of the robot control system 100 is coupled to the communication path 120 and communicatively coupled to the processor 132. The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory computer readable memory 134, other embodiments may include more than one memory module.

In some embodiments, the robot control system 100 may include a display 136 for providing visual output. For example, the display 136 may display a device location, such as a storage compartment location, a location of a base station, a map of devices with which to interact (e.g., one or more storage compartments to be charged), a communications prompt for a user of the system, or other various status, control, or communications related to the robot 110. The display 136 is coupled to the communication path 120. Accordingly, the communication path 120 communicatively couples the display 136 to other modules of the robot 110. The display 136 may include any medium capable of transmitting an optical output such as, for example, a cathode ray tube, light emitting diodes, a liquid crystal display, a plasma display, or the like. Moreover, the display 136 may be a touchscreen that, in addition to providing optical information, detects the presence and location of a tactile input upon a surface of or adjacent to the display 136. Accordingly, each display 136 may receive mechanical input directly upon the optical output provided by the display 136. Additionally, the display 136 may be the display 136 of a portable personal device such as a smart phone, tablet, laptop or other electronic device. The display 136 may be integrated into a portion or portions of the robot 110. The display 136 may be coupled to a handle or another portion of the robot 110 viewable and accessible to a user. Additionally, it is noted that the display 136 can include one or more processors and one or more non-transitory computer readable memories. While the robot 110 includes a display 136 in the embodiment depicted in FIG. 2, the robot 110 may not include a display 136 in other embodiments.

Still referring to FIG. 2, the input device 140 may be coupled to the communication path 120 and communicatively coupled to the processor 132. The input device 140 may be any device capable of transforming user contact into a data signal that can be transmitted over the communication path 120 such as, for example, a button, a lever, a switch, a knob, a touch sensitive interface, a microphone or the like. In some embodiments, the input device 140 includes a pressure sensor, a touch-sensitive region, a pressure strip, or the like. It should be understood that some embodiments may not include the input device 140 or may include more than one input device 140.

The speaker 142 (i.e., an audio output device) is coupled to the communication path 120 and communicatively coupled to the processor 132. The speaker 142 transforms audio message data as signals from the processor 132 of the electronic control unit 130 into mechanical vibrations producing sound. For example, the speaker 142 may be used to communicate from the robot 110 to a user. However, it should be understood that, in other embodiments, the robot 110 may not include the speaker 142.

The microphone 144 may be coupled to the communication path 120 and communicatively coupled to the processor 132. The microphone 144 may be any device capable of transforming a mechanical vibration associated with sound into an electrical signal indicative of the sound. The microphone 144 may be used to capture verbal or other audio commands to the robot 110. It should be understood that some embodiments may not include the microphone 144.

Still referring to FIG. 2, the one or more cameras 146 may be coupled to the communication path 120 and communicatively coupled to the processor 132. The one or more cameras 146 may be any device having an array of sensing devices (e.g., pixels) capable of detecting radiation in an ultraviolet wavelength band, a visible light wavelength band, or an infrared wavelength band. The one or more cameras 146 may be a part of the sensor arrays 135, 135*a* shown in FIGS. 1A and 1B and be used to help the robot 110, 110*a* navigate its environment. Still referring to FIG. 2, the one or more cameras 146 may have any resolution. The one or more cameras 146 may be an omni-directional camera, or a panoramic camera. In some embodiments, one or more optical components, such as a mirror, fish-eye lens, or any other type of lens may be optically coupled to each of the one or more cameras 146. In embodiments described herein, the one or more cameras 146 may provide image data to the electronic control unit 130 of the environment around the robot 110. For example, the one or more cameras 146 may be positioned on the robot arm 150 to serve as an eye for the robot arm 150 in navigating space, capturing image data relating to an external device, such as a storage compartment, or other visual data. In some embodiments, the one or more cameras 146 may be positioned at various locations for viewing the surrounding environment. The one or more cameras 146 may also provide navigation support for embodiments where the robot 110 may operate autonomously or semi-autonomously.

In operation, the one or more cameras 146 capture image data and communicate the image data to the electronic control unit 130. The image data may be received by the processor 132, which may process the image data using one or more image processing algorithms. Any known or yet-to-be developed video and image processing algorithms may be applied to the image data in order to identify an item, determine the location of an item relative to the holding container and other items or even more generally environmental objects for use during navigation of the robot arm 150 and/or the robot 110. An example scenario includes a scenario in which the robot 110 of FIGS. 1A and 3 uses the camera 146 to detect external electrical contacts within an environment in which the robot 110 is navigating. The robot 110 may recognize the external electrical contacts, move to the external electrical contacts, make contact with the external electrical contacts, for example, by extending the robot arm 150 and aligning the robot arm electrical contacts 155 with the external contacts.

Example video and image processing algorithms include, but are not limited to, kernel-based tracking (mean-shift tracking) and contour processing algorithms. In general, video and image processing algorithms analyze may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

Referring to FIG. 2, the network interface hardware 170 is coupled to the communication path 120 and communicatively coupled to the electronic control unit 130. The network interface hardware 170 may be any device capable of transmitting and/or receiving data via a network 180. Accordingly, network interface hardware 170 can include a communication transceiver for sending and/or receiving any wired or wireless communication. For example, the network interface hardware 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 170 includes hardware configured to operate in accordance with the Bluetooth wireless communication protocol. In another embodiment, network interface hardware 170 may include a Bluetooth send/receive module for sending and receiving Bluetooth communications to/from a network 180. The network interface hardware 170 may also include a radio frequency identification ("RFID") reader configured to interrogate and read RFID tags.

In some embodiments, the robot 110 may be communicatively coupled to the network 180. In some embodiments, the network 180 is a personal area network that utilizes a wireless (e.g., Bluetooth) technology to communicatively couple the robot 110 with a management server, a robot control server system, a personal device of a user or any other network connectable device. In other embodiments, the network 180 may include one or more computer networks (e.g., a personal area network, a local area network, or a wide area network), cellular networks, satellite networks and/or a global positioning system and combinations thereof. Accordingly, the robot 110 can be communicatively coupled to the network 180 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 3:
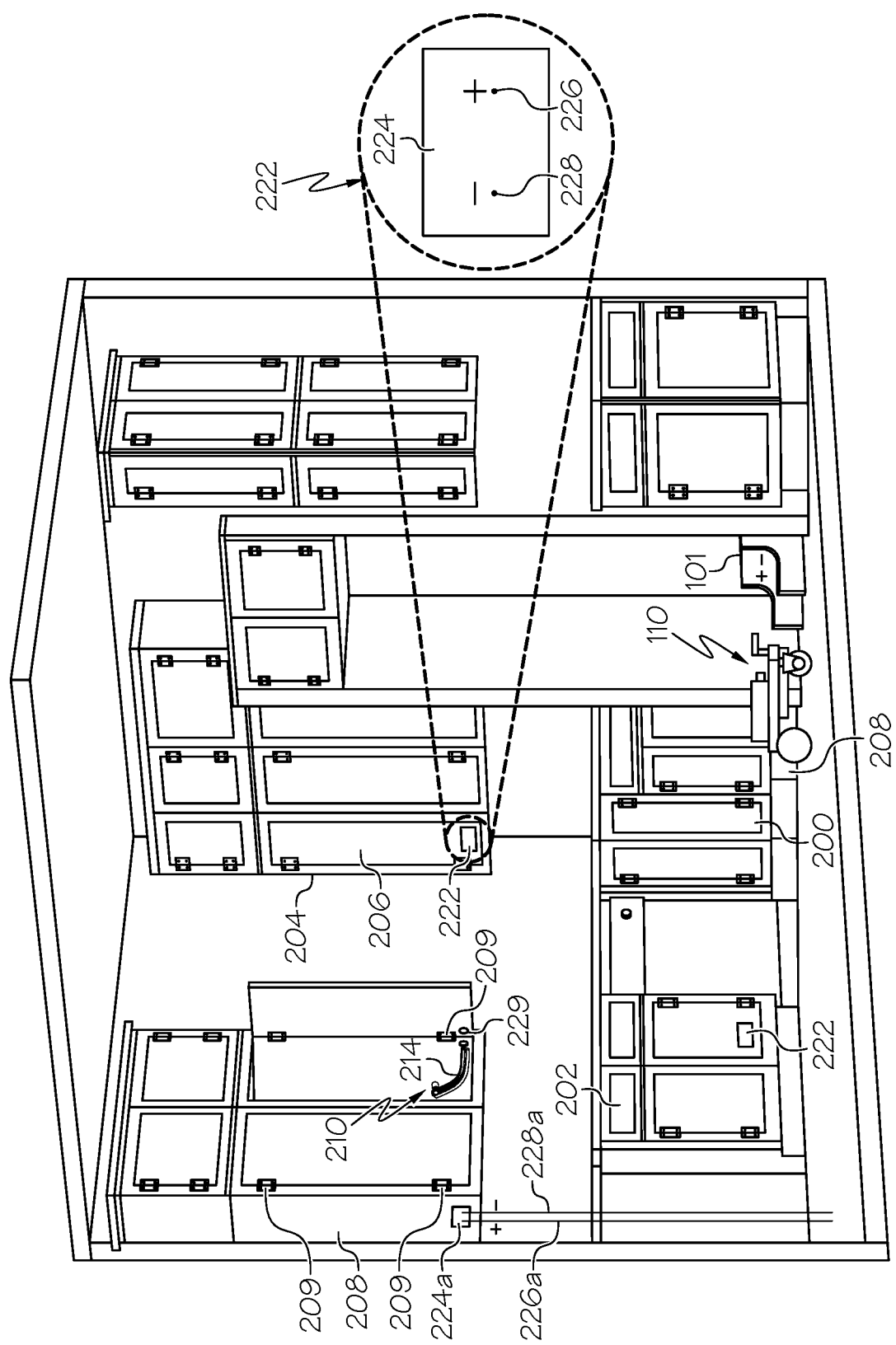
FIG. 3 depicts an illustrative environment in which a robot that delivers electrical power can operate, according to one or more embodiments shown and described herein.

Referring now to FIG. 3, an illustrative environment in which the robot 110 may operate is depicted. FIG. 3 shows a base station 101 for charging the robot 110. The base station 101 may receive electrical energy from a standard 110 V AC wall outlet and convert it to a DC signal for charging the robot 110. In some embodiments, the base station 101 may include a homing beacon or other method for broadcasting its location to the robot 110. In other embodiments, the base station 101 may include network interface hardware and be in periodic, on-demand, or constant communication with the robot 110 via a network, such as the network 180. The base station 101 may include a plurality of electrical contacts for electrically coupling with the robot 110 to charge the battery 138. In other embodiments, the base station 101 may wirelessly charge the battery 138.

Figure 4:
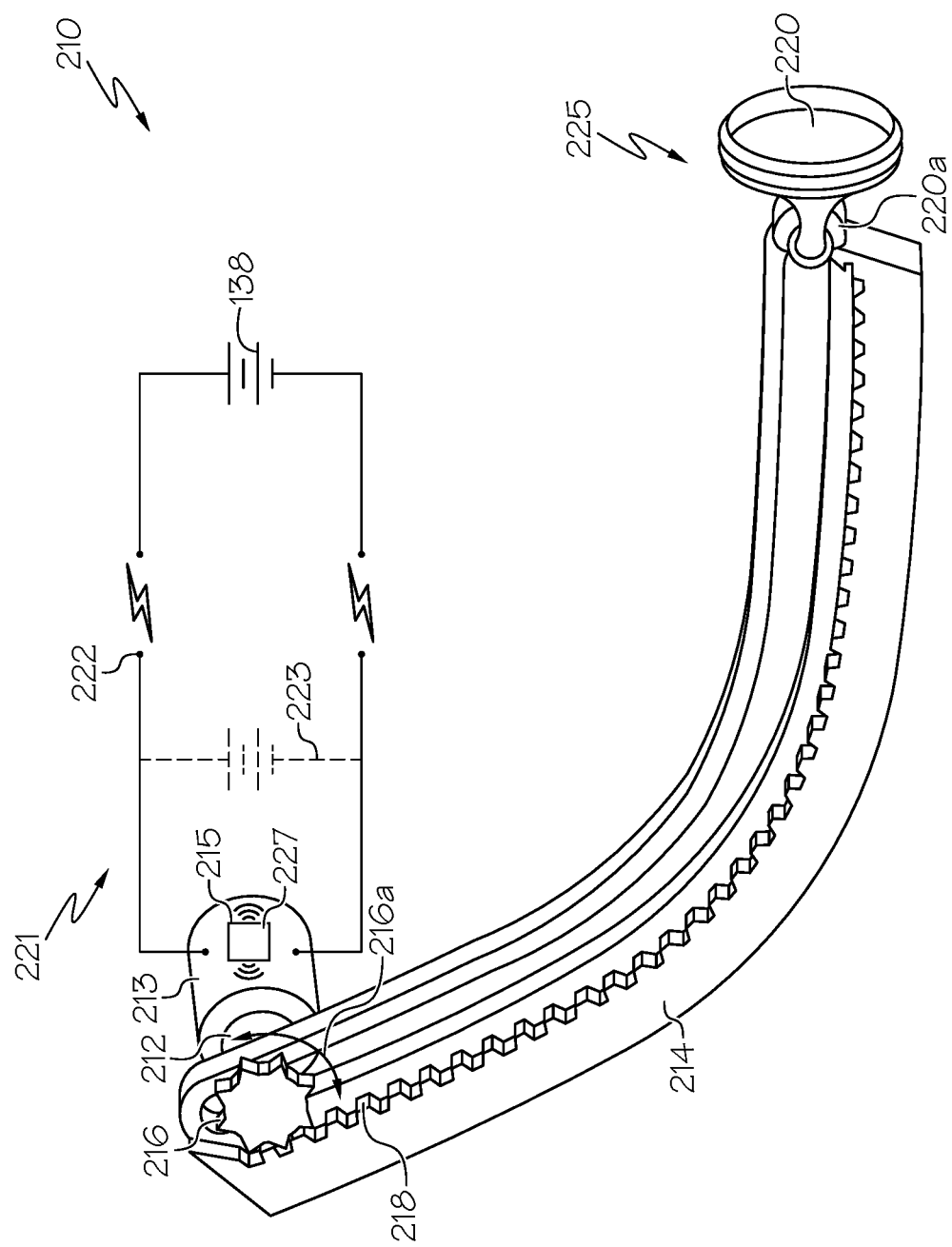
FIG. 4 depicts an electro-mechanical device for opening and closing a storage compartment using robotically applied electrical power, according to one or more embodiments shown and described herein.

Referring now to FIGS. 3 and 4, embodiments of the storage compartments will be described. It is to be understood that the storage compartments described herein are merely one example of a household device that may receive electrical power from a mobile robotic power delivery device. The storage compartments 200 may include one or more drawers 202, cabinets 204, or other storage compartments that include a door 206 that is moveable between an open position and a closed position. The door 206 may be coupled to a base 208 at one or more moveable couplings 209 such as a hinge or a drawer slide. The door 206 may also couple to the base 208 at an opening assembly 210. The opening assembly 210 may include an actuator 212 that is coupled to a controller 213, an actuator arm 214, a mechanism for coupling the actuator 212 to the actuator arm 214, such as a gear 216 and teeth 218, and a mechanism for coupling the actuator arm 214 to the door 206, such as a magnetic coupling 220. The magnetic coupling 220 may moveably couple to the actuator arm 214 at a moveable joint 220a. The magnetic coupling 220 may couple the actuator arm 214 to the door 206 at a magnetic door portion 229. In some embodiments, the opening assembly 210 may be fully enclosed by the storage compartment 200 when it is closed. The controller 213 may be electrically coupled to an electrical circuit 221 that may include the receiver 222 and a charge store 223. The controller 213 may further include a charge sensor 227 for sensing a charge storage level of the charge store 223, such as a battery or the like.

Each opening assembly 210 may include the charge store 223. The charge store 223 may be a device for storing or receiving electrical power. In some embodiments, such as embodiments in which the opening assembly 210 can store its own electrical power, the opening assembly 210 may include a battery and/or capacitive storage system for storing electrical energy. In other embodiments, the robot 110 may apply electrical power to the opening assembly 210 each time the door 206 is opened and/or shut. In some embodiments, a battery and/or capacitive storage system may store sufficient electrical energy for a certain number of cycles of the opening assembly 210. The size (i.e., electrical power capacity) of the charge store 223 may be based on a user-selected number of cycles of the opening assembly 210. For example, a user may select an external device with an opening assembly 210 that has a charge store with a large or a small capacity based on the number of times the user expects to cycle (e.g., open or close) the external device. If the charge store 223 is used to open a storage compartment that will be opened frequently, it may be useful to have a larger charge store so that the robot 110 does not need to return to the charge store 223 each time the opening assembly 210 is cycled. Conversely, if the storage compartment is not cycled frequently, for efficiency's sake, it may have charge store 223 with a smaller capacity.

To receive electrical power, each door 206 may include the receiver 222. The receiver 222 may be exterior to the door 206. In some embodiments, the receiver 222 may include a connector body 224 that comprises an external electrical connection, a first electrical contact 226, and a second electrical contact 228. In some embodiments, the first electrical contact 226 and the second electrical contact 228 may be magnetized and one or more portions of the robot arm 150 may be magnetized for magnetic coupling of the first electrical contact 226, the second electrical contact 228, and the robot arm 150. In some embodiments, the receiver 222 may include a corrosion resistant material, such as silver cadmium, tin, or another material that improves resistance to oxidation, corrosion, and/or voltage break-over effects, and enhances electrical integrity over time. In other embodiments, the corrosion resistant material may be plated on the receiver 222.

In some embodiments, the exterior electrical connection includes one or more wires suspended from the opening assembly 210. In such an embodiment, a connector body 224a may be mechanically coupled to an external portion of the storage compartments 200. For example, the connector body 224a may couple to an external portion of the base 208. However, embodiments are not limited to this arrangement. It is contemplated that the connector body 224a may couple to the door 206 or some other portion of the storage compartment 200.

The connector body 224a may include a first wire 226a and a second wire 228a that connect to the electrical circuit 221 of the opening assembly 210. The first wire 226a and the second wire 228a may hang from the connector body 224a towards the ground. The robot 110 may include an end effector that is configured to electrically couple the battery 138 with the first wire 226a and the second wire 228a to provide electrical energy to the opening assembly 210 such as the robot arm electrical contacts 155a. In some embodiments, wires that power the opening assembly 210 may be integrated into the walls of a storage compartment or a room and protrude just enough such that they can be contacted by the robot 110.

In some embodiments, the opening assembly 210 may include one or more communication ports 215, the charge store 223 for storing an electrical charge, and a charge sensor 227 for determining whether the charge store 223 has an electrical charge. The charge store 223 may generate a low charge signal when the charge sensor 227 senses a low charge condition. The actuator 212 may be any type of electrical or mechanical actuator configured to move the actuator arm 214. As shown in FIG. 4, the actuator is a motor, but it is contemplated that the actuator 212 could be any type of actuator such as a magnetic, hydraulic, pneumatic, or mechanical actuator. At a second end 225 of the actuator arm 214 is the magnetic coupling 220.

The controller 213 may be a processor that collects data, communicates with the robot 110 via the one or more communication ports 215, and performs other processing associated with opening and closing of the storage compartments 200. Available communication ports 215 include Bluetooth (Class and Low Energy), WiFi (ad-hoc and Access Point mode), cell modem (CDMA/GSM/LTE), Ethernet, high speed USB (dual mode, supporting connection to a PC as a peripheral, acting a host when a USB flash drive is attached), and ANT (for connection to external sensors). Accordingly, the controller 213, the robot 110, or both may include one or more antennas for generating a signal using Bluetooth, WiFi, GPS, cell, and ANT. In some embodiments, Bluetooth Low Energy may be used for an initial link, and communication may transition to WiFi for faster speeds. The controller 213 may generate a control signal for opening and closing the storage compartments 200 based on an input from the robot 110. For example, the controller may generate at least an opening signal and a closing signal for opening and closing the storage compartment.

Upon receipt of a control signal, the actuator 212 may actuate to turn the gear 216. The actuator 212 can turn the gear 216 in at least two directions, as illustrated by double arrow 216a. As shown in FIG. 4, the actuator arm 214 is in an extended configuration which corresponds with an open position of the door 206. The mechanical connection between the gear 216 and the teeth 218 pushes the actuator arm 214 outward as the actuator 212 actuates, opening the door 206. Upon receipt of a second control signal, the actuator 212 may actuate to turn the gear 216 in an opposite direction, thereby closing the door 206. The magnetic coupling 220 between the door 206 and the opening assembly 210 may be such that the forces that couple the door 206 and the opening assembly 210 can be overcome without much effort by an ordinary human user. Because the magnetic coupling 220 between the door 206 and the opening assembly 210 can be overcome, the door 206 can be opened by a human user or otherwise without actuation of the opening assembly 210 or a detrimental effect on various components, thereby allowing a human user to open the door 206 manually.

Further, in some instances, a door 206 may be left open with the opening assembly 210 in a closed-door configuration (i.e., with the door 206 open and the actuator arm 214 pulled back, separated from the door 206). In such an instance, an opening control signal can be generated causing the actuator arm 214 to move to an open configuration. The magnetic coupling 220 magnetically couples with the corresponding magnetic door portion 229, and if a closing control signal is generated, the opening assembly 210 closes the door 206.

The controller 213 generates the opening and closing control signals used by the opening assembly 210 to open and close the door 206 as described herein. The controller 213 may be any type of controller capable of generating at least two distinct signals. The controller 213 may communicatively couple with the robot 110 using a wired connection or a wireless connection. For example, the controller 213 may communicatively couple with the robot 110 using a Bluetooth low energy connection. In other embodiments, the controller 213 may receive a control signal via the first electrical contact 226 and the second electrical contact 228.

Referring again to FIGS. 3 and 4, use of the robot control system 100 depicted in FIGS. 1A, 1B, and 2 will be described with respect to opening and closing a door 206 of a storage compartment 200. A user of the robot control system 100 may determine that the storage compartment 200 should be opened. The user may interact with the robot 110 using the input device 140 which may display one or more instructions, prompts, questions or other information regarding the robot control system 100 on the display 136. For example, the electronic control unit 130 may contain instructions that may cause a map of the storage compartments 200 to be displayed on the display 136. A user may select one storage compartment 200 from the map on the display 136. In other embodiments, the electronic control unit 130 may cause a location of the particular storage compartment 200 to be identified audibly using the speaker 142. In some embodiments, the robot 110 may receive instructions audibly using the microphone 144.

Once the user has selected which storage compartments 200 to open, the robot 110 may move into position to open the selected storage compartment or compartments. The robot 110 may move into position using the motorized wheel assembly 158. The robot 110 may locate itself in the correct position using the location sensor 154. For example, the robot 110 may receive a GPS signal that enables the robot 110 to know that it is in the correct position to open the storage compartment 200. In other embodiments, the robot 110 may use the proximity sensor 160 to know that it is in the correct location to open the storage compartment 200. In yet other embodiments, the appropriate storage compartment 200 may be identified using the cameras 146.

Once the selected storage compartment 200 has been identified and the robot 110 is in the correct position to apply an electrical charge to the receiver 222 to open the door 206, the robot 110 may electrically couple with the connector body 224, 224a. In some embodiments, the robot 110 may extend the robot arm 150 such that the robot arm electrical contacts 155 make contact with the receiver 222. In other embodiments, the robot 110 may wirelessly charge the opening assembly 210 using the wireless charger module 148. In yet other embodiments, for example, an embodiment in which the robot 110a of FIG. 1B is used, the robot 110a may pass beneath the wires 226a, 228a such that the wires 226a, 228a are received in the troughs 156, 156'. In the embodiments, an electrical charge from the battery 138 charges the electrical circuit 221 and provides electrical energy to the controller 213 and the actuator 212.

Once sufficient electrical energy is applied to the controller 213 and the actuator 212, the controller 213 can cause the actuator 212 to cycle. The actuator 212 turns the gear 216 and causes the actuator arm 214 to extend from a retracted position corresponding to a closed position of the door 206 to an extended position corresponding to an open position of the door 206. When the user no longer desires the door 206 to be open, the robot 110 can apply a second charge to the electrical circuit 221 causing the actuator to return to the retracted position and closing the door 206. It should be noted that, in embodiments, it is not necessary that the robot 110 charges the electrical circuit 221 every time the door 206 is to be opened. It is contemplated that the electrical circuit 221 may store a charge sufficient to cycle the door 206 a certain number of times (e.g., three, four, five, etc. times), but that the robot 110 is mobilized to charge the electrical circuit 221 as described herein. For example, the charge store 223 may retain sufficient electrical energy to open and close the door 206 once, twice, or any number of times. Accordingly, the robot 110 may only need to apply electrical energy to the opening assembly 210 when the electrical energy is depleted.

In some embodiments, a user may activate one or more electrical or mechanical systems to cause the door to open when the charge store 223 has a sufficient charge to cause the door 206 to cycle. For example, the user may push a button (not shown) to cause the door 206 to cycle. In such an embodiment, the robot 110 does not need to interact with the opening assembly 210 unless the charge store 223 is depleted and the opening assembly 210 does not have sufficient charge to cycle.

In some embodiments, the robot 110 may be configured to routinely charge the opening assembly 210. For example, the robot 110 may charge the opening assembly 210 based on the length of time that has passed since the last charge or the number of openings and closings of the opening assembly 210 since the last charge. In some embodiments, the robot 110 may be configured to recharge a group of opening assemblies 210 based on the total number of cycles of the group.

In some embodiments, the robot 110 may return to the base station 101 based on certain criteria. For example, the robot 110 may return when the battery 138 is depleted below a particular level. As another example, the robot 110 may return to the base station 101 when the battery does not hold sufficient electrical energy to charge a particular number of the opening assemblies 210. In some embodiments, the robot 110 may remain at the base station 101 and charge the battery 138 until the condition that caused the robot 110 to need to charge the battery 138 has cleared.

In some embodiments, the wires 226a, 228a, may hang from a table, drawer, cabinet or other storage location and connect to a wireless charging pad or other surface for wirelessly charging various portable devices, for example, a portable computing device like a cell phone or a tablet computer. The robot 110a may proceed beneath the table, drawer, cabinet, or other storage location to connect the battery 138 to the wires 226a, 228a and apply electrical power to the wireless charging pad. The devices may be placed on the wireless charging pad and may charge once the robot 110a has electrically coupled with the wires 226a, 228a and applied sufficient electrical energy to charge the devices. For example, a wireless charge pad may be placed on a coffee table with wires such as the wires 226a, 228a hanging from the wireless charge pad. The robot 110a may pass beneath the coffee table to apply electrical power to the wireless charge pad and to charge one or more devices resting on the wireless charge pad.

Figure 5:
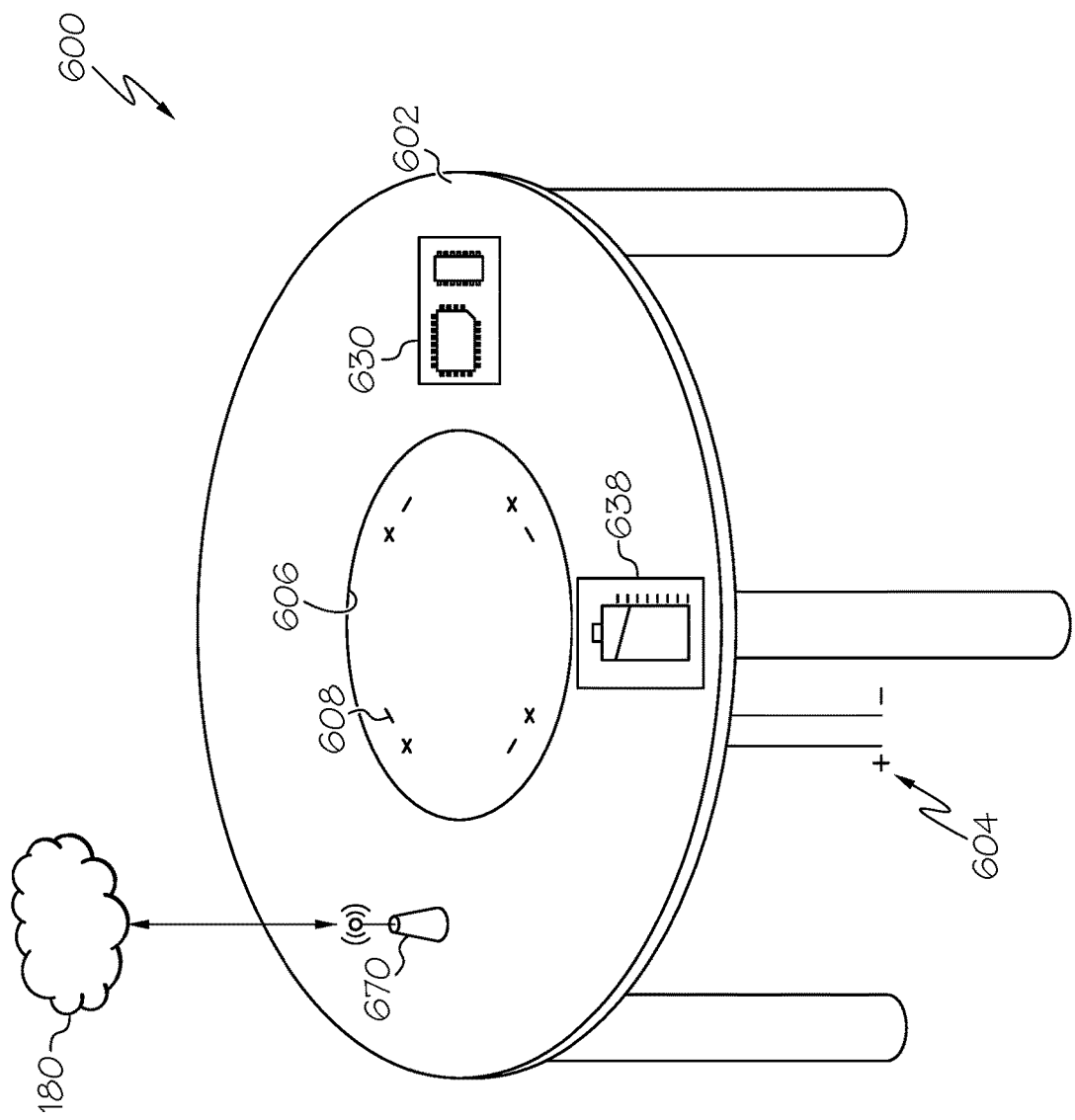
FIG. 5 shows a device for receiving electrical power from a robot and for delivering electrical power to a plurality of external devices at the same time, according to one or more embodiments shown and described herein.

Referring to FIG. 5, another potential embodiment of a system for receiving an electrical charge from the robot 110/110a of FIGS. 1A and 1B is shown. FIG. 5 shows a recharging system 600 having the form of a coffee table 602 and including electrical contacts 604. The coffee table 602 may include a charging surface 606 with multiple charging locations 608 around the charging surface 606. The charging locations 608 could be contact or inductive charging locations as discussed above. The recharging system 600 may include a recharging system ECU 630 and recharging system network interface hardware 670 that may connect to an external network, such as the network 180. The recharging system ECU 630 may include one or more machine-readable instructions for causing a mobile robotic power delivery device to deliver electrical power.

In some embodiments, one or more user devices may electrically and/or communicatively couple to the recharging system 600 at the charging locations 608 on the charging surface 606. The recharging system 600 may be configured to determine a battery charge level of the user devices. The recharging system 600 may include instructions for automatically calling a mobile robotic power delivery device to apply electrical power to the recharging system 600 based on the battery level of the user devices. For example, a user may place a user device with a low battery charge level on the charging surface 606. The recharging system 600 may determine that the battery charge level of the user device is low and that the user device requires a charge. Accordingly, the recharging system 600 may communicatively couple with a mobile robotic power delivery device to deliver electrical power to the user device.

In some embodiments, the recharging system 600 may include a recharging system battery 638 that may store sufficient electrical power to charge multiple user devices but may eventually require a recharge if the recharging system 600 is not electrically coupled to a constant power supply. In such embodiments, the mobile robotic power delivery device may be configured to apply electrical power based on a demand of the user, based on the electrical power level of the recharging system battery 638, or based on some other criteria, such as a routine battery charging cycle or schedule.

Figure 6:
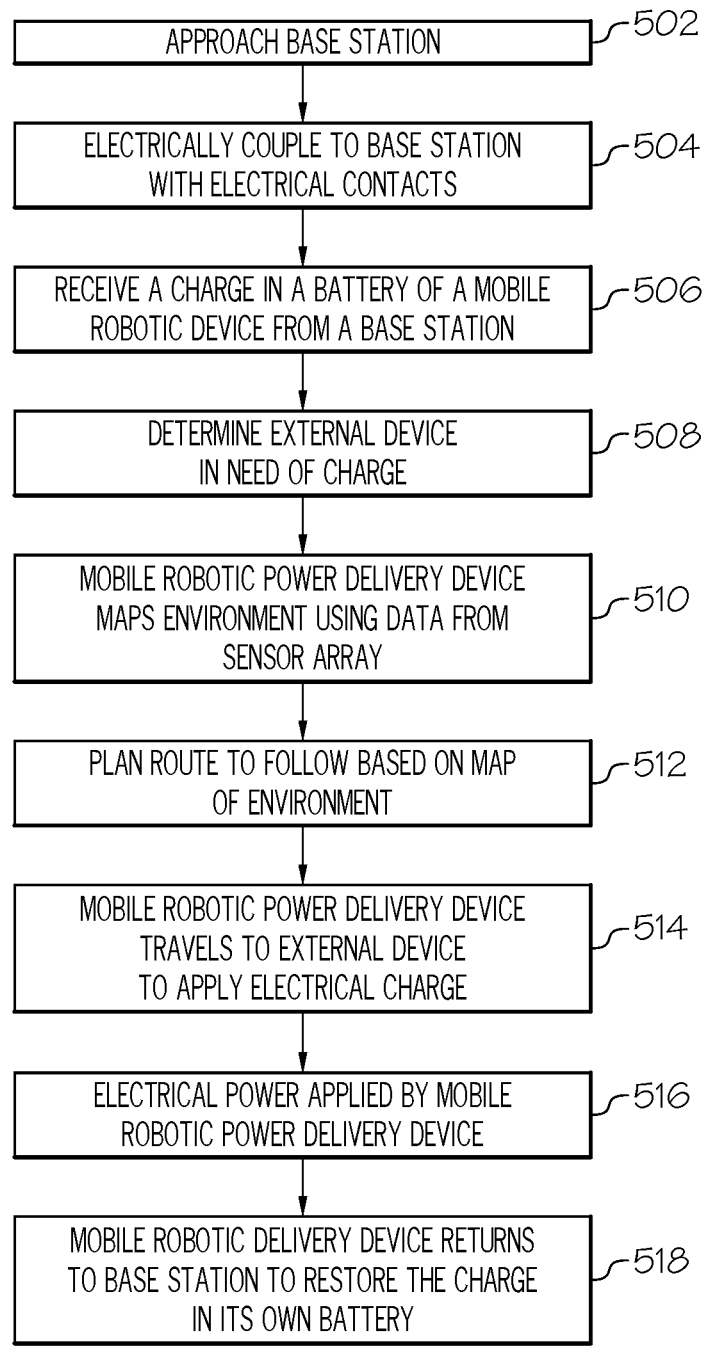
FIG. 6 depicts a method for using a robot system to apply electrical power to one or more external electrical circuits, according to one or more embodiments shown and described herein.

Referring now to FIG. 6, a method for providing electrical energy to an external device, such as an electro-mechanical device, an electronic device, or an IoT device, using a mobile robotic power delivery device (e.g., the robot 110 of FIG. 1A) may include a plurality of steps. A mobile robotic power delivery device may receive a charge in a battery of the mobile robotic power delivery device from a base station. For example, the mobile robotic power delivery device may approach the base station at step 502, electrically couple to electrical contacts of the base station at step 504, and receive an electrical charge from the base station at step 506, electrically charging a battery of the mobile robotic power delivery device, such as the battery 138 shown in FIGS. 1A/1B.

At step 508, the external device in need of a charge is determined. For example, a user of the mobile robotic power delivery device may select or determine to actuate an electro-mechanical device and give an order to the mobile robotic power delivery device to charge the external device. In another example, the mobile robotic power delivery device may receive a signal from an external device to be charged. Such a signal or user input may be received, for example, when a user wants to actuate the external device. Referring to the particular example shown in FIG. 3, the user may select a particular storage compartment to open and/or close. The user may interact with the mobile robotic power delivery device using a mobile device, a display or controller that may be local or remote to the mobile robotic power delivery device, or some other device capable of ordering the actions of the mobile robotic power delivery device, such as a remote control to order the mobile robotic power delivery device to apply a charge to the battery of the electro-mechanical device. In some embodiments, the electro-mechanical device chosen to actuate may be determined autonomously.

The mobile robotic power delivery device may travel to the external device to apply the electrical charge. At step 510, the mobile robotic power delivery device may map its environment using data from the sensor array. The map may include objects in the environment, for example, the map may include electro-mechanical devices in the environment and/or obstacles in the environment. At step 512, the mobile robotic power delivery device may plan a route to follow based on the location of the electro-mechanical device to power and the one or more other objects in the environment, such as the other storage compartments and other objects. In some embodiments, the mobile robotic power delivery device may receive a planned route from a base station or some other outside computing device through a network.

At step 514, the mobile robotic power delivery device may travel to the external device to apply an electric charge following the route that it planned. In the example embodiment shown in FIGS. 3 and 4, the robot 110 may travel to an appropriate location and then contact the robot arm 150 with the electrical contacts 226, 228 to apply a charge to the electrical contacts 226, 228 to charge the opening assembly 210.

Still referring to FIG. 6, at step 516, electrical power is applied by the mobile robotic power delivery device. In some embodiments, the electrical power is applied each time the electro-mechanical device is ordered to actuate. In other embodiments, the electro-mechanical device includes a local charge storage device (e.g., a battery or capacitive device) such that the mobile robotic power delivery device does not need to apply electrical power to the electro-mechanical device each time the electro-mechanical device actuates. In such embodiments, the mobile robotic power delivery device or some other device, such as a mobile device of the user, may simply send an actuation signal (e.g., an open or close signal) to the electro-mechanical device and the device may actuate. In this type of embodiment, the mobile robotic power delivery device may be configured such that it applies an electrical charge at routine intervals or when the local charge storage device of the electro-mechanical device is at a particular level. Accordingly, the local charge storage device may include a device for monitoring and reporting the charge storage level local to the electro-mechanical device (e.g., a battery level). The mobile robotic power delivery device may not deplete its own power supply such that it can return to charge its battery or so that it can charge other devices.

At step 518, the mobile robotic power delivery device returns to the base station to restore the charge to its own battery. The base station may be electrically coupled to a constant source of electrical power, e.g., a 110 V wall outlet, etc. The mobile robotic power delivery device may charge its battery until it is sufficiently charged to actuate one or more other electro-mechanical devices and/or it may charge its battery until it is completely charged. In some embodiments, the mobile robotic power delivery device may continue to charge its battery until it has, at least, sufficient electrical charge to apply sufficient electrical power to approach at least one electro-mechanical device, apply an electrical charge to the electro-mechanical device, and return to the base station. In some embodiments, the mobile robotic power delivery device will not leave the base station until such charge is on the battery, even if ordered by a user.

In some embodiments, the electro-mechanical device that is to receive a charge may be selected from a plurality of electro-mechanical devices based on one or more criteria. For example, the electro-mechanical device may be selected based on a selection of the user. In other embodiments, the electro-mechanical device may be selected based on a charge store level of the electro-mechanical device. Other methods of selecting which electro-mechanical device to charge are contemplated, for example, it is contemplated that a particular electro-mechanical device may be selected based on a schedule of recharging multiple electro-mechanical devices.

It should now be understood that a robot system can be used to apply electrical power to one or more external battery-operated systems, such as an electro-mechanical or an IoT device like the storage compartments described herein. The application of electrical energy can aid users, for example users with disabilities, to open and close storage compartments or to apply electrical energy to other internet of things devices, as well as personal mobile devices, such as cell phones, personal digital assistants, and other personal devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
a door;
an external electrical connection electrically coupled to a charge store; and
an opening assembly including a controller, an actuator, a gear, and an actuator arm, wherein:
the actuator arm is mechanically coupled to the actuator and removably coupled to the door such that the actuator arm opens or closes the door upon actuation of the actuator,
the external electrical connection is able to be electrically coupled to a mobile robotic power delivery device that includes a battery to provide electrical power to the actuator and the controller.

2. The system of claim 1, wherein the mobile robotic power delivery device electrically couples to the external electrical connection through a wireless electrical connection to apply electrical power to the charge store.

3. The system of claim 1, wherein the mobile robotic power delivery device comprises a plurality of electrical contacts that, when contacted with the external electrical connection, electrically couple the battery to the charge store.

4. The system of claim 1, wherein the controller receives an opening signal or a closing signal and the controller causes the actuator to open or close the door in response to the opening signal or the closing signal.

5. The system of claim 4, wherein the opening signal and the closing signal are generated by the mobile robotic power delivery device.

6. The system of claim 4, wherein the opening signal and the closing signal are generated as a result of a user input to open or close the door.

7. The system of claim 1, wherein the controller includes a charge sensor for sensing a charge storage level of the charge store.

8. The system of claim 7, wherein the charge store comprises sufficient electrical power for a plurality of door openings and closings.

9. The system of claim 7, wherein the controller is configured to transmit a low charge signal when the charge sensor senses a low charge condition of the charge store.

10. A robotic power delivery system comprising:
a robot comprising:
a battery electrically coupled to an end effector that is configured to contact a receiver of an external electrical circuit;
a mobile base; and
an electronic control unit comprising a processor and a non-transitory computer readable memory storing one or more instructions that, when executed by the processor, cause the robot to:
supply an electrical charge from the battery to the receiver,
send an opening signal or a closing signal to a controller that is communicatively coupled to the receiver such that the controller causes an actuator to open or close a door based on the opening signal and the closing signal.

11. The system of claim 10, wherein the end effector is coupled to a robot arm.

12. The system of claim 11, wherein the robot arm comprises a plurality of electrical contacts for contacting the external electrical circuit.

13. The system of claim 12, wherein the robot arm supplies the electrical charge to the receiver of the external electrical circuit via a wireless electrical connection.

14. The system of claim 10, wherein the mobile base is a motorized wheel assembly.

15. The system of claim 10, wherein the opening signal and the closing signal are transmitted via Bluetooth low energy.

16. The system of claim 10, further comprising a base station for charging the battery of the robot.

17. A system for applying an electrical charge, the system comprising:
a mobile robotic power delivery device comprising a battery;
a charging station for charging the battery of the mobile robotic power delivery device; and
an external device comprising a charge store and one or more of an electrical component and an electromechanical component,
wherein the mobile robotic power delivery device receives an electrical charge from the charging station, determines a location of the external device, moves to the external device, supplies a second electrical charge to the charge store of the external device, and sends an opening signal or a closing signal to the external device.

18. The system of claim 17, wherein the one or more of the electrical component and the electromechanical component of the external device comprise one or more of an opening assembly for a storage compartment, a lock, a smoke detector, and a door.

19. The system of claim 18, wherein the external device includes a receiver, the opening signal or the closing signal being sent to a controller that is communicatively coupled to the receiver such that the controller causes an actuator to open or close the opening assembly based on the opening signal or the closing signal.

20. The system of claim 17, wherein the mobile robotic power delivery device is communicatively coupled with the external device such that the external device transmits a signal to the robot to request an electrical charge to the charge store.

* * * * *